Nov. 13, 1951     J. P. VAN HORN     2,574,673
PNEUMATIC TUBE CARRIER RETRIEVER
Filed July 29, 1950
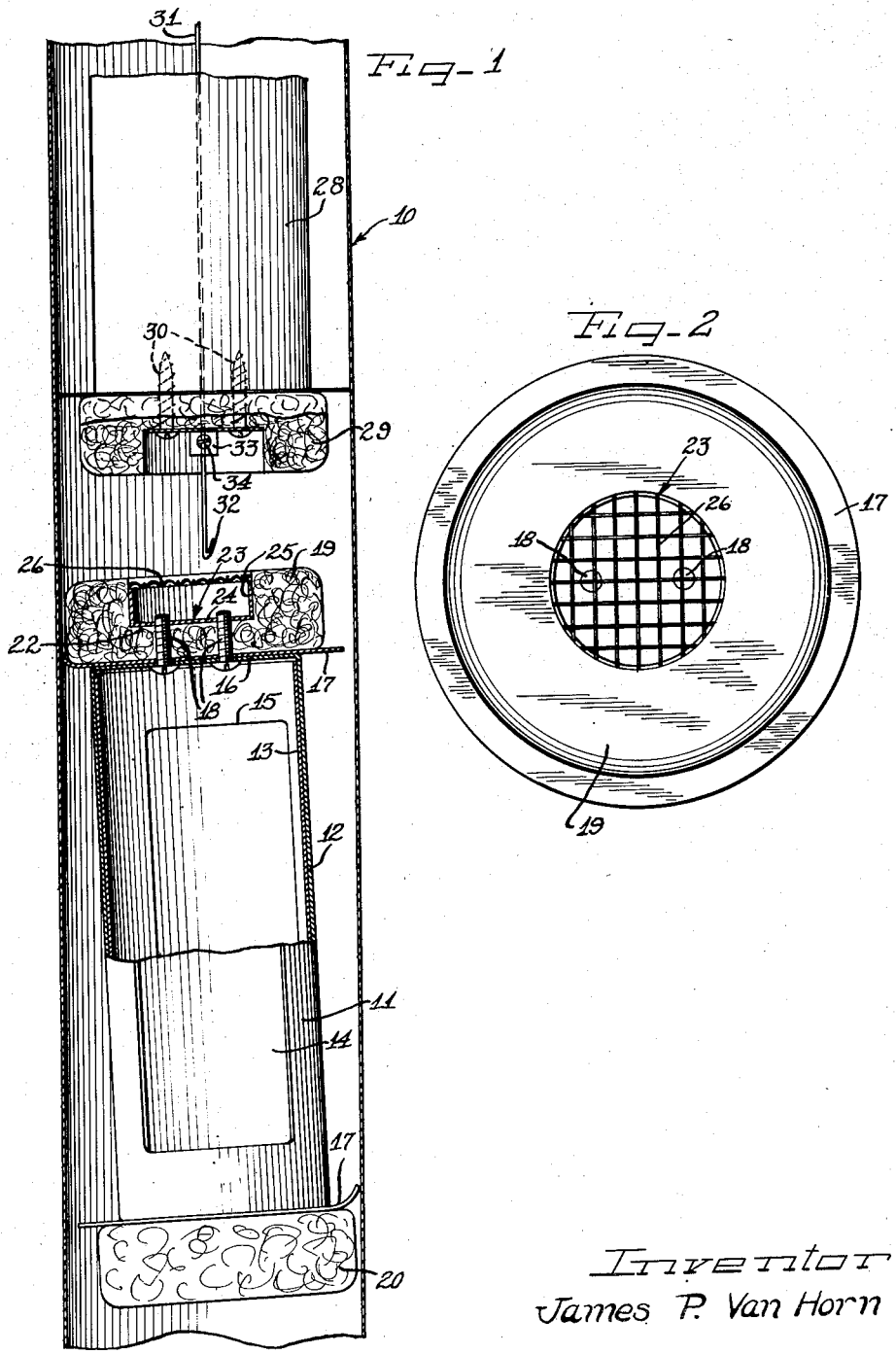
Inventor
James P. Van Horn Patented Nov. 13, 1951

2,574,673

UNITED STATES PATENT OFFICE 2,574,673

PNEUMATIC TUBE CARRIER RETRIEVER

James P. Van Horn, Libertyville, Ill.

Application July 29, 1950, Serial No. 176,609

7 Claims. (Cl. 243—37)

1

The present invention relates to a new type of pneumatic tube carrier and particularly to carriers which are used in pneumatic tube systems for conveying change and the like from one portion of a department store to another. Such pneumatic systems ordinarily include a conduit system in which the carrier is propelled by virtue of an air pressure differential maintained between sections of the conduit system.

One of the difficulties encountered in the use of such pneumatic systems has been the tendency of the carriers to become lodged within the conduit between stations. In order to retrieve such lodged carriers, it has been previously necessary to attempt to push them out of the tube with a flexible rod or wire and when this does not succeed, to dismantle the conduit system in the area in which the carrier had become lodged. Such dismantling, of course, puts the pneumatic conveyor system out of operation for extended periods of time.

An object of the present system is to provide a pneumatic conveyor system in which carriers which become lodged therein may be rapidly recovered without dismantling of the entire system.

Another object of the present invention is to provide a novel carrier for use in pneumatic tube conveyor systems.

Still another object of the present invention is to provide a retriever for carriers which can become lodged in pneumatic tube conveyor systems.

In the present invention, I have provided a novel type of cash carrier for use in pneumatic conveyor systems, the carrier being provided with a perforate portion on at least one end thereof capable of engaging a retrieving means whereby the carrier may be retrieved from within the pneumatic conveyor system when the carrier becomes accidentally lodged therein.

A further description of the present invention will be made in conjunction with the attached sheet of drawings in which:

Figure 1 is a fragmentary view of a pneumatic conveyor system with parts in elevation illustrating a condition where a cash carrier is lodged within the conduit, and also illustrating a retrieving means which may be utilized in the present practice; and Figure 2 is an enlarged end view of the carrier illustrated in Figure 1.

As shown in the drawings:

The reference numeral 10 indicates generally a conduit which forms part of a pneumatic conveyor system operated under such suitable conditions of differential air pressure to propel the various carriers therein. A carrier 11 is illustrated in Figure 1 as being lodged within the conduit 10. The carrier 11 includes a pair of closely fitting co-axial cylinders 12 and 13, each of these cylinders being provided with a relatively wide longitudinal slot 14. Upon turning of the outer cylinder 12, the slot 14 may be put in registry with a similar slot 15 in the inner cylinder 13 to provide access to the interior of the carrier 11. The outer cylinder 12 has an end portion 16 forming an end closure for the carrier 11 and a flexible resilient washer 17 is secured to the end portion 16 as by means of machine screws 18 to provide an efficient air seal.

Each of the ends of the carrier 11 are provided with a resilient head portion consisting of felt discs 19 and 20, which function to absorb the shock incident to the normal rough handling which the carriers encounter.

It will be understood that one of the discs is secured to the outer cylinder 12 and the other to the inner cylinder 13 so that upon twisting of one of the end portions, the slots in the respective inner and outer cylinders 12 and 13 may be brought into registry.

In the present invention, I have provided a novel type of structure for the end assembly of the carrier 11. The structure on each end of the carrier 11 is identical so that a description of one end will suffice.

The felt disc 19 is provided with a central recess 22 which receives a cup-shaped cylindrical adapter 23. The structure of the adapter 23 will be evident from the broken-away portions of Figure 1, and also from the end view illustrated in Figure 2. As shown in the drawing, the adapter 23 includes a base portion 24 seated at the base of the recess 22 and held thereon by virtue of the screws 18. The adapter 23 also has an integral wall portion 25, and a metallic wire screen 26 is secured across the open end of the adapter in parallel spaced relation to the base portion 24. The screen 26 may be secured to the wall 25 by means of welding, soldering, or the like. The screen 26 is preferably composed of steel wire strands of relatively small diameter.

In Figure 1 I have illustrated a condition where the carrier 11 has become lodged within the conduit 10 due to a displacement of the longitudinal center of the carrier 11, causing the ends of the washers 17 to become deflected and held along the walls of the conduit 10. It will be appreciated that such carriers may become lodged in the conduit due to foreign matter present along the inner walls of the conduit or due to the presence of dents or other protuberances in the conduit wall.

In order to retrieve the lodged carrier 11, a specially designed retriever unit may be employed. In the drawings, I have illustrated one such unit as including a body portion 28 which may be composed of wood or the like, with each of its ends provided with a felt shock absorbing disc 29. The disc 29 is rigidly secured to the body member 28 as by means of screws 30. A wire tape or similar relatively flexible member 31 extends through the body member 28 and is of sufficient length so that the retriever may be guided through the conduit system by merely inserting the retriever within the open end of the conduit and playing out the tape 31 until the retriever is in contact with the carrier 11.

The end of the wire tape 31 is provided with a hook portion 32 extending beyond the outermost edges of the felt disc 29. The wire tape 31 is held within the body member 28 by means of a collar 33 and a lock screw 34 so that a fixed length of tape 31 extends beyond the body member 28. The hook portion 32 is adapted to engage the wire screen 26 at one end of the carrier 11. It will be appreciated that more than one hook may be provided if so desired.

It is believed that the operation of the system will be apparent from an inspection of the drawings. When a carrier 11 has become lodged as illustrated in Figure 11, it is merely necessary to insert the retriever unit into an open end of the pneumatic conduit until the hook portion 32 engages one or more strands of the wire screen 26. Then it is a simple matter to manipulate and exert tension on the wire tape 31 until the carrier 11 is dislodged from engagement with the walls of the conduit 10.

From the foregoing, it will be appreciated that I have herein provided a useful carrier for use in pneumatic conveying systems. Through the use of the system of the present invention, any carrier which becomes inadvertently lodged in the conduit can be readily recovered in a short time without the necessity of dismantling the conduit system as heretofore was frequently necessary.

It will be understood that modifications and variations may be effected without departing from the scope of the novel concepts of the present invention.

I claim as my invention:

1. A pneumatic tube carrier comprising a hollow casing and an end closure for said casing having a perforated portion thereon spaced from the end closure.

2. A pneumatic tube carrier comprising a hollow cylindrical casing and an end closure for said casing, said end closure having a recessed portion therein, and a perforate screen overlying said recessed portion.

3. A pneumatic tube carrier comprising a hollow casing, a centrally recessed closure member at each end of said casing, a cylindrical adapter having a base portion secured within the central recess of said closure, and a perforate screen on said adapter spaced from said base portion.

4. A pneumatic tube carrier comprising a hollow cylindrical casing, a centrally recessed closure member secured at each end of said casing and providing an air tight closure for said casing, and an adapter seated within the central recess of said closure member, said adapter including a perforate screen portion accessible from the end of said end closure.

5. In a pneumatic conveyor system wherein a tube is conveyed within a conduit by virtue of a pressure differential therein, a carrier comprising a cylindrical casing, an end closure secured to each end of said casing, each of said end closures being provided with a perforate screen portion, a retriever comprising a body member arranged to travel freely within said conduit, a hook extending from said body member arranged to engage said screen upon contact therewith, and a flexible tension member secured to said body member for manipulating said retriever within said conduit.

6. In a pneumatic conveyor system wherein a carrier tube is conveyed with a conduit by virtue of a pressure differential therein, a carrier comprising a cylindrical casing, a centrally recessed end closure secured at each end of said casing, an adapter including a base portion secured within the recess of said end closure, a perforate screen overlying said base portion, and a retriever comprising a body member arranged to travel freely within said conduit, a hook extending from said body member arranged to engage said screen upon contact therewith, and a wire secured to said body member for manipulating said retriever within said conduit.

7. A pneumatic tube carrier comprising a casing having a recessed end and a hook-engaging perforate member secured to the carrier over the open side of the recess.

JAMES P. VAN HORN.

REFERENCES CITED

The following references are of record in the file of this patent:

UNITED STATES PATENTS

| Number | Name | Date |
| --- | --- | --- |
| 859,700 | Smith | July 9, 1907 |
| 1,719,144 | Stokes et al. | July 2, 1929 |
| 2,014,571 | Jennings | Sept. 17, 1935 |

FOREIGN PATENTS

| Number | Country | Date |
| --- | --- | --- |
| 329,706 | Germany | Jan. 18, 1920 |